United States Patent
Uematsu et al.

(10) Patent No.: US 6,438,939 B1
(45) Date of Patent: Aug. 27, 2002

(54) COMBINED CYCLE POWER PLANT AND COOLING STEAM SUPPLY METHOD FOR GAS TURBINE THEREIN

(75) Inventors: Kazuo Uematsu; Kazuharu Hirokawa; Hidetaka Mori; Hideaki Sugishita, all of Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 15 days.

(21) Appl. No.: 09/709,425

(22) Filed: Nov. 13, 2000

Related U.S. Application Data

(63) Continuation-in-part of application No. 09/202,452, filed as application No. PCT/JP98/01727 on Dec. 15, 1998, now Pat. No. 6,205,762.

(30) Foreign Application Priority Data

| Apr. 15, 1997 | (JP) | ................................. 9-097284 |
| Apr. 15, 1997 | (JP) | ................................. 9-097285 |
| Apr. 16, 1997 | (JP) | ................................. 9-098933 |
| May 27, 1997 | (JP) | ................................. 9-136600 |
| Jun. 23, 1997 | (JP) | ................................. 9-165914 |

(51) Int. Cl.$^7$ ................................. F02C 6/00
(52) U.S. Cl. ................................. 60/39.182; 60/775
(58) Field of Search ................................. 60/775, 39.182, 60/39.53, 736

(56) References Cited

U.S. PATENT DOCUMENTS

| 5,577,377 A | 11/1996 | Tomlinson ............... 60/39.182 |
| 5,628,179 A | 5/1997 | Tomlinson ............... 60/39.182 |
| 5,979,156 A | 11/1999 | Uematsu ............... 60/39.182 |
| 6,205,762 B1 * | 3/2001 | Uematsu et al. ......... 60/39.182 |
| 6,338,241 B1 * | 1/2002 | Shibuya et al. .......... 60/39.182 |

FOREIGN PATENT DOCUMENTS

| EP | 0 743 425 | 11/1996 |
| JP | 5-163960 | 6/1993 |
| JP | 6-93879 | 4/1994 |
| JP | 6-323162 | 11/1994 |
| JP | 7-4210 | 1/1995 |
| JP | 7-7119413 | 5/1995 |
| JP | 9-88519 | 3/1997 |
| JP | 9-256815 | 9/1997 |
| JP | 10-77806 | 3/1998 |
| JP | 10-131719 | 5/1998 |

* cited by examiner

*Primary Examiner*—Charles G. Freay
(74) *Attorney, Agent, or Firm*—Wenderoth, Lind & Ponack, L.L.P.

(57) ABSTRACT

A combined cycle power plant includes a combination of a gas turbine plant and steam turbine plant. The gas turbine cooling steam temperature is adjusted appropriately so that the gas turbine can be made of easily obtainable material. Steam supplied from the intermediate pressure evaporator is mixed into the cooling steam supply passage for supplying therethrough exhaust steam from the high pressure steam turbine into the gas turbine high temperature portion as cooling steam. Thus, cooling steam temperature is lowered without lowering of the entire efficiency, and material of less heat resistant ability becomes usable as material forming the gas turbine high temperature portion to be cooled. Thus, design and manufacture of the gas turbine may be satisfied by less expensive and easily obtainable material.

8 Claims, 8 Drawing Sheets

COMBINED CYCLE POWER PLANT AND COOLING STEAM SUPPLY METHOD FOR GAS TURBINE THEREIN

This is a continuation-in-part of application Ser. No. 09/202,452, filed Dec. 15, 1998, now U.S. Pat. No. 6,205,572, which is a 371 of PCT/JP98/01727 filed on Apr. 15, 1998.

BACKGROUND OF THE INVENTION:

1. Field of the Invention

The present invention relates to a combined cycle power plant in which a gas turbine plant and a steam turbine plant are combined, and to a cooling steam supply method for a gas turbine in operation thereof.

2. Description of the Prior Art

A combined cycle power plant is a power system in which a gas turbine plant and a steam turbine plant are combined, wherein a gas turbine takes charge of a high temperature section of thermal energy and a steam turbine takes charge of a low temperature section thereof. Therefore, the thermal energy is recovered for an effective use thereof and this power system is now being paid a high amount of attention.

In the combined cycle power plant research and development are being carried out aiming at a higher temperature gas turbine as one means for enhancing the efficiency.

On the other hand, in order to attain such a higher temperature, improvement of the cooling system which takes account of heat resisting ability of turbine structural elements must be pursued. As a result of various trials and errors, a steam cooled system which uses steam as the cooling medium, instead of a prior art use of compressed air, is now in progress.

One example thereof is the Japanese laid-open patent application No. Hei 05 (1993)-163960, wherein a cooling steam is obtained from intermediate pressure steam of a waste heat recovery boiler. However, a sufficient volume of steam is not obtainable which results in difficulty in achieving a stable and secure cooling.

Thus, as a further progress thereafter, in order to achieve a sufficient volume and a stable cooling, a cooling system using exhaust steam from a high pressure steam turbine as the cooling steam is now being developed.

In the prior art steam cooled system as mentioned above, progress has been made from the system using intermediate pressure steam as the cooling medium to that using high pressure exhaust steam, and thus the practicality has been enhanced further. However, the high pressure exhaust steam is of a high temperature at the same time, hence a gas turbine high temperature portion (which is a portion to be cooled) must be made of a selected material which can resist such a high temperature.

A high temperature resistible material, being required to be of properties necessary for that material, becomes very expensive. Furthermore, in case of a turbine disc among others for example, there is a large difficulty in obtaining an appropriate material therefor within limited conditions of price and the like, which leads to a serious problem in the design and manufacture of the plant.

SUMMARY OF THE INVENTION

In view of the problems in the prior art, it is an object of the present invention to provide a combined cycle power plant and a cooling steam supply method for a gas turbine thereof wherein the temperature of cooling steam used as a cooling medium is appropriately adjusted so that the functional stability of the steam cooled system is not damaged. Therefore, the gas turbine can be made of an easily obtainable material.

In order to attain the object, a first embodiment hereof provides a combined cycle power plant comprising a combination of a gas turbine plant, a waste heat recovery boiler and a steam turbine plant. The gas turbine plant is constructed of a gas turbine, an air compressor driven by the gas turbine and a combustor for burning fuel together with compressed air supplied from said air compressor. The waste heat recovery boiler generates steam by using exhaust heat from the gas turbine as a heat source and is constructed of portions, mutually connected by pipings, of a high pressure steam generating portion, an intermediate pressure steam generating portion and a low pressure steam generating portion. The high pressure steam generating portion comprises a high pressure economizer, a high pressure feed water pump, a high pressure evaporator and a high pressure superheater. The intermediate pressure steam generating portion comprises an intermediate pressure economizer, an intermediate pressure feed water pump, an intermediate pressure evaporator and an intermediate pressure reheater. The low pressure steam generating portion comprises a low pressure economizer, a low pressure feed water pump, a low pressure evaporator and a low pressure superheater.

The steam turbine plant is constructed of steam turbines, mutually connected by piping, including a high pressure turbine, an intermediate pressure turbine and a low pressure turbine. The high pressure turbine is supplied with high pressure steam from the high pressure steam generating portion. The intermediate pressure turbine is supplied with intermediate pressure steam from the intermediate pressure steam generating portion, and the low pressure turbine is supplied with low pressure steam from the low pressure steam generating portion.

Steam supplied from the intermediate pressure evaporator is mixed into a cooling steam supply passage for supplying therethrough exhaust steam from the high pressure turbine as cooling steam into a high temperature portion of said gas turbine to be cooled.

That is, in the first embodiment, the exhaust steam from the high pressure turbine is first selected as the cooling medium of the gas turbine high temperature portion. Then, the intermediate pressure steam supplied from the intermediate pressure evaporator of the waste heat recovery boiler is mixed into the exhaust steam from the high pressure turbine. Thus, the cooling medium of a lowered temperature is made up and is supplied into the gas turbine high temperature portion for cooling thereof.

Thus, the high pressure exhaust steam, which is sufficient in volume, is mixed with the intermediate pressure steam, which is of a lower temperature but has a pressure nearly equal to that of the high pressure exhaust steam. Therefore, the high pressure exhaust steam is lowered in temperature and the high temperature portion to be cooled of the gas turbine can be made of a material of less heat resistant ability and a stable cooling can be effected without lowering of the entire efficiency.

Alternatively, the high pressure exhaust steam, which is sufficient in volume, may be mixed with a cooling water spray instead of the intermediate pressure steam. Therefore, the high pressure exhaust steam is appropriately lowered in temperature by the cooling water spray, so that the high temperature portion of the gas turbine is maintained at an appropriate temperature. As a result, the high temperature portion of the gas turbine which is to be cooled can be made of a material of less heat resistant ability, and a stable cooling can be effected without lowering of the entire efficiency of the power plant.

In other words, regardless of whether the intermediate pressure steam is mixed into the high pressure exhaust steam, the high pressure exhaust steam is mixed with the cooling water spray so as to be lowered in temperature anyway. Therefore, the intermediate pressure steam is stopped, and the cooling water spray is increased and mixed with the high pressure exhaust steam to be supplied into the high temperature portion of the gas turbine for cooling thereof. Thus, the steam from the intermediate pressure evaporator, which is available in less volume, is effectively supplied into the intermediate pressure turbine for work therein, and is effectively used for other necessary purposes. As a result, the steam is used more efficiently, and the efficiency of the combined plant is enhanced.

A second embodiment hereof includes a combined cycle power plant comprising a combination of a gas turbine plant, a waste heat recovery boiler and a steam turbine plant.

The gas turbine plant is constructed of a gas turbine, an air compressor driven by the gas turbine and a combustor for burning fuel together with compressed air supplied from the air compressor. The waste heat recovery boiler is for generating steam by using exhaust heat from the gas turbine as a heat source and is constructed of portions, mutually connected by pipings, of a high pressure steam generating portion, an intermediate pressure steam generating portion and a low pressure steam generating portion. The high pressure steam generating portion comprises a high pressure economizer, a high pressure feed water pump, a high pressure evaporator and a high pressure superheater. The intermediate pressure steam generating portion comprises an intermediate pressure economizer, an intermediate pressure feed water pump, an intermediate pressure evaporator and an intermediate pressure reheater. The low pressure steam generating portion comprises a low pressure economizer, a low pressure feed water pump, a low pressure evaporator and a low pressure superheater.

The steam turbine plant is constructed of steam turbines, mutually connected by pipings, of a high pressure turbine, an intermediate pressure turbine and a low pressure turbine. The high pressure turbine is supplied with high pressure steam from the high pressure steam generating portion. The intermediate pressure turbine is supplied with intermediate pressure steam from the intermediate pressure steam generating portion, and the low pressure turbine is supplied with low pressure steam from the low pressure steam generating portion.

A passage to be cooled by fuel from the gas turbine is provided to a cooling steam supply passage for supplying therethrough exhaust steam from the high pressure turbine as cooling steam into a high temperature portion of the gas turbine to be cooled.

That is, in the second embodiment, the exhaust steam from the high pressure turbine is first selected as the cooling medium of the gas turbine high temperature portion. Then, the exhaust steam is not directly used as the cooling steam to be supplied into the gas turbine high temperature portion, but is heat-exchanged with the gas turbine fuel to be lowered in temperature and then supplied into the gas turbine high temperature portion for cooling thereof.

A sufficient amount of the exhaust steam from the high pressure turbine is available as cooling steam, but this exhaust steam is also of a high temperature. Hence, it is heat-exchanged with the gas turbine fuel to be lowered in temperature, thereby the gas turbine high temperature portion to be cooled can be made of a material which is of a less heat resistant ability and yet a stable cooling can be effected without the entire efficiency being lowered.

A third embodiment hereof includes a combined cycle power plant comprising a combination of a gas turbine plant, a waste heat recovery boiler and a steam turbine plant. The gas turbine plant is constructed of a gas turbine, an air compressor driven by the gas turbine and a combustor for burning fuel together with compressed air supplied from the air compressor.

The waste heat recovery boiler is for generating steam by exhaust heat from the gas turbine as a heat source and is constructed of portions, mutually connected by pipings, of a high pressure steam generating portion, an intermediate pressure steam generating portion and a low pressure steam generating portion. The high pressure steam generating portion comprises a high pressure economizer, a high pressure feed water pump, a high pressure evaporator and a high pressure superheater. The intermediate pressure steam generating portion comprises an intermediate pressure economizer, an intermediate pressure feed water pump, an intermediate pressure evaporator and an intermediate pressure reheater. The low pressure steam generating portion comprises a low pressure economizer, a low pressure feed water pump, a low pressure evaporator and a low pressure superheater.

The steam turbine plant is constructed of steam turbines, mutually connected by pipings, of a high pressure turbine, an intermediate pressure turbine and a low pressure turbine. The high pressure turbine is supplied with high pressure steam from the high pressure steam generating portion. The intermediate pressure turbine is supplied with intermediate pressure steam from the intermediate pressure steam generating portion, and the low pressure turbine is supplied with low pressure steam from the low pressure steam generating portion.

A reheater is provided as a means for reheating steam which has cooled a high temperature portion of the gas turbine to be cooled.

That is, in the third invention, the construction is such that the steam which has cooled the gas turbine high temperature portion can be led into the reheater so as to be reheated there. Thus, even if the cooling steam after being used for cooling of the gas turbine is not high enough at a predetermined temperature because the gas turbine is not of a high enough temperature or the cooling has not been effected sufficiently or the like, then the cooling steam is reheated by the reheater and the necessary heat for the downstream steam turbines (such as the intermediate steam turbine) can be secured resulting in enhancement of the thermal efficiency.

A fourth embodiment here of includes a combined cycle power plant comprising a combination of a gas turbine plant, a waste heat recovery boiler and a steam turbine plant.

The gas turbine plant is constructed of a gas turbine, an air compressor driven by the gas turbine and a combustor for burning fuel together with compressed air supplied from the air compressor.

The waste heat recovery boiler is for generating steam by exhaust heat from the gas turbine as a heat source and is constructed of portions, mutually connected by pipings, of a high pressure steam generating portion, an intermediate pressure steam generating portion and a low pressure steam generating portion. The high pressure steam generating portion comprises a high pressure economizer, a high pressure feed water pump, a high pressure evaporator and a high pressure superheater. The intermediate pressure steam generating portion comprises an intermediate pressure economizer, an intermediate pressure feed water pump, an intermediate pressure evaporator and an intermediate pressure reheater. The low pressure steam generating portion comprises a low pressure economizer, a low pressure feed water pump, a low pressure evaporator and a low pressure superheater.

The steam turbine plant is constructed of steam turbines, mutually connected by pipings, of a high pressure turbine, an intermediate pressure turbine and a low pressure turbine. The high pressure turbine is supplied with high pressure steam from the high pressure steam generating portion, the intermediate pressure turbine is supplied with intermediate pressure steam from said intermediate pressure steam generating portion, and the low pressure turbine is supplied with low pressure steam from the low pressure steam generating portion.

A high pressure turbine by-pass passage is provided for connecting a superheated steam supply passage for supplying therethrough superheated steam from the high pressure superheater into the high pressure turbine, and a cooling steam supply passage for supplying therethrough exhaust steam from the high pressure turbine as cooling steam into a high temperature portion to be cooled of the gas turbine.

That is, according to the fourth embodiment, when the plant is to be started in accordance with operation procedures such as in WSS where the plant stops once a week, in DSS where the plant stop once a day or the like, the gas turbine is warmed up in advance by using the auxiliary boiler or its own compressed air. The initial steam generated by the boiler is supplied into the cooling steam passage of the gas turbine via the high pressure turbine by-pass passage, so that the warming-up is assisted so as to be accelerated.

When the boiler steam gets out of initial steam stage to start to be generated stably, the high pressure turbine by-pass passage is closed and the high pressure superheated steam is led into the high pressure turbine and the situation is changed gradually so that the cooling of the gas turbine is done by the high pressure exhaust steam from the high pressure turbine so that no thermal shock etc. is caused and the cooling of the gas turbine can be done stably.

A fifth embodiment hereof includes a cooling steam supply method in the combined cycle power plant as mentioned in the first invention. The gas turbine is supplied with the cooling steam as the combined cycle power plant is operated such that when the inlet temperature of the high pressure turbine is set to approximately 566° C., the inlet pressure of the high pressure turbine is adjusted to 165 to 175 ata, and the exhaust steam from the high pressure turbine is maintained at a temperature of 330 to 250° C. and a pressure of 35 to 30 ata.

That is, in the fifth embodiment, the inlet pressure of the high pressure turbine is adjusted to 165 to 175 ata. Therefore, the high pressure exhaust steam property is lowered to 330 to 250° C. and 35 to 30 ata at the outlet of the high pressure turbine. Thus, the cooling steam can be lowered in temperature without the efficiency of the downstream equipment (the intermediate pressure turbine for example) being lowered. In addition, the downstream gas turbine high temperature portion to be cooled can be made of a material of less heat resistant ability and that is less expensive and yet a stable cooling can be effected without the entire efficiency being lowered.

A sixth embodiment hereof includes a cooling steam supply method in the combined cycle power plant as mentioned in any one of the first to fourth embodiments, characterized in that the high temperature portion of the gas turbine to be cooled is supplied with auxiliary steam prior to starting the gas turbine so that the gas turbine is warmed up. The auxiliary steam has the pressure of the combustion gas or greater at starting time of the gas turbine.

The gas turbine is then started in that state to do a holding operation for a predetermined time at a predetermined load. When steam from the waste heat recovery boiler comes to a condition of the auxiliary steam, the supply of the auxiliary steam is stopped and steam is supplied, by-passing the high pressure turbine, from the high pressure superheater of the waste heat recovery boiler into the high temperature portion of the gas turbine to be cooled.

When output of the waste heat recovery boiler comes to a rating thereof, the by-passing is closed and exhaust steam from the high pressure turbine is supplied into the high temperature portion of the gas turbine to be cooled so as to switch to a rated operation.

That is, in the sixth embodiment, when the plant is to be started in accordance with operational procedures such as in WSS where the plant stops once a week, in DSS where the plant stops once a day or the like, the cooling steam is supplied into the gas turbine portion to be cooled in the following procedures.

Firstly, the auxiliary steam at a pressure which is not less than that of the combustion gas effective at the starting time of the gas turbine is supplied into the gas turbine in advance of the starting thereof so that the gas turbine is warmed up. Then, the gas turbine is started so as to do a holding operation for a predetermined time at a predetermined load. The steam temperature and steam pressure of the waste heat recovery boiler are increased gradually, and when the steam condition of the waste heat recovery boiler comes to the steam condition of the auxiliary steam which has been used for the warming-up, the supply of auxiliary steam is stopped. The high pressure superheated steam which by-passes the high pressure turbine is then supplied into the gas turbine. When the output, or the steam condition, of the waste heat recovery boiler comes to a rating, the by-passing is closed so that the high pressure superheated steam is supplied into the high pressure turbine and the exhaust steam from the high pressure turbine is supplied into the gas turbine. Thus, the rated operation takes place.

A seventh embodiment hereof includes a cooling steam supply method in the combined cycle power plant as mentioned in any one of the first to fourth embodiments, characterized in that while the high temperature portion to be cooled of the gas turbine is closed upstream and downstream thereof, the gas turbine is started so as to do a holding operation for a predetermined time at a low load level which requires no cooling of the high temperature portion of the gas turbine.

When the waste heat recovery boiler comes to a level to generate a predetermined boiler steam, the closing is opened and steam is supplied, by-passing the high pressure turbine, from the high pressure superheater of the said waste heat recovery boiler into the high temperature portion of the gas turbine to be cooled.

When the output of the waste heat recovery boiler comes to a rating thereof, the by-passing is closed and exhaust steam from the high pressure turbine is supplied into the high temperature portion to be cooled of the gas turbine so as to switch to a rated operation.

That is, in the seventh embodiment, when the plant is to be started in accordance with operational procedures such as in WSS where the plant stops once a week, in DSS where the plant stops once a day or the like, the gas turbine portion to be cooled is first closed, by stop valves etc. for example, upstream and downstream thereof and the gas turbine is started. The gas turbine is held in the low load of approximately 20% load from no load which requires no cooling of the gas turbine portion to be cooled. When the boiler steam of the waste heat recovery boiler starts to be generated to reach a predetermined state of approximately 20 ata, for example, then the stop valves etc. are opened and the high pressure superheated steam, which by-passes the high pressure turbine, is supplied into the gas turbine portion to be cooled. When the gas turbine is further speeded up and the steam from the waste heat recovery boiler comes to a high temperature to reach what is called a rated state of 40 ata, for example, then the by-passing is closed and the high pressure exhaust steam from the high pressure turbine is supplied into the gas turbine portion to be cooled. Thus, the rated operation takes place.

An eighth embodiment hereof includes a combined cycle power plant as mentioned in any one of the first to fourth embodiments, characterized in that a dust collecting filter is provided at a cooling steam inlet portion of the high temperature portion of the gas turbine, and a mesh of the dust collecting filter is less than 1000 $\mu$m and, specifically, in a range of 100 to 1000 $\mu$m.

That is, in the eighth embodiment, the gas turbine is a recovery type steam cooled one, wherein there are provided cooling passages in the combustor, stationary blades and moving blades which are the high temperature portion of the gas turbine. The exhaust steam from the steam turbine is led into the cooling passages as the cooling steam. The dust collecting filter is provided at the cooling steam inlet portion of the gas turbine high temperature portion and the mesh thereof is less than 1000 $\mu$m and, specifically, in the range of 100 to 1000 $\mu$m. If the mesh is too small, fine particles contained in the steam may be caught, and clogging of the mesh is accelerated so as to make a long use thereof impossible so that frequent changes of the mesh are required. As the cooling steam temperature is usually a high temperature of 250° C. or more, there is a difficulty in the exchange work of the mesh. But if the mesh is in the range of 100 to 1000 $\mu$m, fine particles pass therethrough and these particles scarcely stay in the cooling steam passage with little possibility of accumulation therein because the cooling steam flows therein at a high velocity. Also, there is a case where solids of dropped scales such as iron oxide etc. in the main steam piping system flow into the cooling steam passage with a fear of blockage thereof, but the mesh is in the range of 100 to 1000 $\mu$m so that the solids, being larger than the mesh usually, can mostly be removed by the mesh.

As mentioned above, according to the dust collecting filter, fine particles contained in the steam pass through the mesh and comparatively large solid particles only can be removed by the mesh. Thus, a long hour use of the mesh becomes possible and frequent exchange work of the mesh due to clogging becomes lessened.

Further, the dust collecting filter is provided in the cooling steam passage at the inlet portion of the gas turbine high temperature portion with a simple structure of the mesh portion being detachable. As a result, no large dust collecting device is needed and the system construction can be simplified.

A ninth embodiment hereof includes a combined cycle power plant as mentioned in any one of the first to fourth embodiments, characterized in that there are provided an impurity removing device which is exclusive for treating water for temperature adjustment, an economizer which is exclusive for heating the water from the impurity removing device and a spray nozzle for spraying the water heated at the economizer into cooling steam which flows into the high temperature portion of the gas turbine to be cooled. Therefore, the cooling steam temperature is adjusted.

That is, in the ninth embodiment, the gas turbine is a recovery type steam cooled one, wherein the cooling steam is led from the steam turbine system into the gas turbine high temperature portion for cooling thereof, and this cooling steam is returned to the steam turbine system for recovery. But there is sometimes a case where the temperature of the cooling steam is not appropriate for cooling of the gas turbine high temperature portion. As the gas turbine high temperature portion, there are stationary blades and moving blades, for example. The steam temperature which is appropriate for cooling of the stationary blades is higher than that appropriate for cooling of the moving blades. Hence, if the cooling steam is not of an appropriate temperature for cooling of the stationary blades, the cooling steam is required to be lowered in temperature. In this case, the temperature is adjusted by water being sprayed into the steam. In such case where the water is so sprayed, impurities are contained in the water which need to be removed. If the entire amount of the water which has been condensed is to be treated, then the facilities therefor become large and the cost therefor also increases.

Thus, in the present invention, the exclusive impurity removing device is provided which has a capacity only to treat the water amount necessary for adjusting the cooling steam temperature, and the exclusive economizer for heating only the water so treated at the impurity removing device. As the cooling steam is of a high temperature in the range of 250 to 600° C., the water is heated at the economizer so that the temperature of that water is approached as near as possible to the cooling steam temperature. The high temperature water so heated at the economizer is sprayed into the cooling steam for adjustment of the temperature thereof.

According to the present invention, an exclusive impurity removing device of the capacity to only treat the amount of water necessary for adjusting the cooling steam temperature, and an exclusive economizer for heating only the water so treated at the impurity removing device are provided. Thus, the cooling steam temperature adjusting system can be compact-sized with no large facilities being needed, the feed water is heated to become the high temperature water of a temperature near the cooling steam temperature, and the adjustment of the cooling steam temperature can be done efficiently.

DESCRIPTION OF THE PREFERRED EMBODIMENTS

A first embodiment according to the present invention will be described with reference to FIG. 1. All the embodiments according to the present invention are made on the basis of a combined cycle power plant consisting basically of three portions of a gas turbine, a steam turbine and a waste heat recovery boiler and the whole aspect of this combined cycle power plant will be described first.

Figure 1:
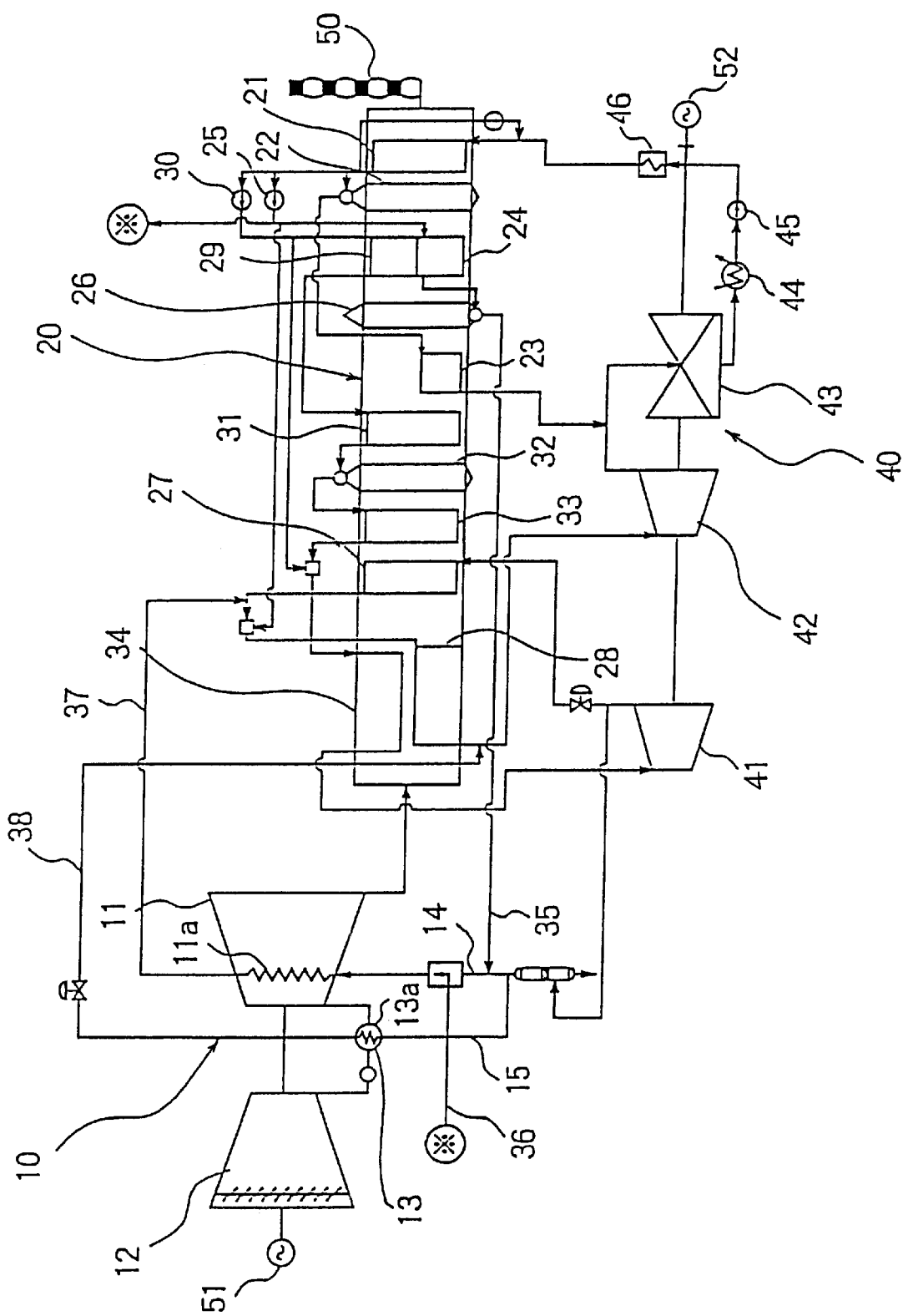
FIG. 1 is a diagrammatic view showing a combined cycle power plant of a first embodiment according to the present invention.

In FIG. 1, numeral 10 designates a gas turbine plant, which comprises as main equipments a gas turbine 11, an air compressor 12 driven by the gas turbine 11, and a combustor 13 for burning a fuel together with a compressed air supplied from the air compressor 12.

There are provided within the gas turbine 11 moving blades, stationary blades and the like (not shown), which correspond to a high temperature portion 11a which requires cooling. The combustor 13 comprises therein a tail tube cooled portion 13a which extends from a combustion chamber rear portion to a combustion gas outlet, and this tail tube cooled portion 13a is also a portion requiring cooling, like the high temperature portion 11a.

Also provided are a cooling steam supply passage 14 for supplying therethrough a cooling steam to the high temperature portion 11a of the gas turbine 11 and a cooling steam bifurcation passage 15, bifurcated from the cooling steam supply passage 14, for supplying therethrough the cooling steam to the tail tube cooled portion 13a of the combustor 13.

Numeral 20 designates a waste heat recovery boiler, which uses an exhaust gas of the gas turbine 11 as a heat source and comprises therein portions of a low pressure steam generating portion, an intermediate pressure steam generating portion and a high pressure steam generating portion.

If equipment included in the respective steam generating portions are shown approximately in the order of steam flow therein, then the low pressure steam generating portion is composed of a low pressure economizer 21, a low pressure evaporator 22, a low pressure superheater 23, etc., and the intermediate pressure steam generating portion is composed of an intermediate pressure economizer 24, an intermediate pressure feed water pump 25, an intermediate pressure evaporator 26, an intermediate pressure first reheater 27, an intermediate pressure second reheater 28. etc.

Also, the high pressure steam generating portion is composed of a high pressure first economizer 29, a high pressure feed water pump 30, a high pressure second economizer 31, a high pressure evaporator 32, a high pressure first superheater 33, a high pressure second superheater 34, etc.

Numeral 40 designates a steam turbine plant, which comprises a high pressure turbine 41 supplied with a high pressure steam from the high pressure second superheater 34 of the waste heat recovery boiler 20, an intermediate pressure turbine 42 supplied with an intermediate pressure steam from the intermediate pressure second reheater 28, and a low pressure turbine 43 supplied with an exhaust steam from the intermediate pressure turbine 42 and a low pressure steam from the low pressure superheater 23.

It is to be noted that the construction is made such that an exhaust steam from the low pressure turbine 43 is condensed into water at a condenser 44 provided downstream thereof. This water is circulated to the waste heat recovery boiler 20 via a boiler feed water pump 45 and a gland steam condenser 46 sequentially. Numeral 50 designates a stack, numeral 51 designates a generator driven by the gas turbine plant 10 and numeral 52 designates a generator driven by the steam turbine plant 40.

While various equipment is named and described schematically, the present embodiment relates to a combined cycle power plant consisting of the gas turbine plant 10, the waste heat recovery boiler 20 and the steam turbine plant 40, and further includes the following construction.

That is, an intermediate pressure steam supply passage 35 connects at one end to the intermediate pressure evaporator 26 of the waste heat recovery boiler 20 so as to take out an intermediate pressure steam therefrom. This intermediate pressure steam supply passage 35 connects at its other end to the cooling steam supply passage 14 at a position downstream of a bifurcation position of the cooling steam supply passage 14 and the cooling steam bifurcation passage 15 so that the intermediate pressure steam is mixed into the cooling steam supply passage 14.

Also, a back-up spray water supply passage 36 connects at one end to the cooling steam supply passage 14 at a position further downstream of a connection position of the cooling steam supply passage 14 and the intermediate pressure steam supply passage 35 and at it's the other end to the intermediate pressure feed water pump 25 upstream thereof.

Numeral 37 designates a gas turbine cooling steam recovery passage, which connects to an inlet side of the intermediate pressure second reheater 28. Numeral 38 designates a tail tube cooling steam recovery passage, which connects to an outlet side of the intermediate pressure second reheater 28.

In the present embodiment constructed as above, cooling of the high temperature portion 11a of the gas turbine 11 and the tail tube cooled portion 13a of the combustor 13, while in a steady operation, is done as follows.

That is, a high pressure exhaust steam from the high pressure turbine 41 is supplied into the cooling steam supply passage 14 to be bifurcated on the way. One portion thereof flows to the combustor 13 via the cooling steam bifurcation passage 15 for cooling the tail tube cooled portion 13a, and the other flows to the gas turbine 11 via the cooling steam supply passage 14 for cooling the high temperature portion 11a thereof.

At this time, the cooling steam flowing to the gas turbine 11 via the cooling steam supply passage 14 is mixed with the intermediate pressure steam supplied from the intermediate pressure evaporator 26 via the intermediate pressure steam supply passage 35, so that temperature of the cooling steam in the cooling steam supply passage 14 is lowered.

If one example of such temperature lowering is to be shown, the temperature of the high pressure exhaust steam coming out of the high pressure turbine 41 is approximately 370° C. If a turbine portion, especially a movable portion such as a moving blade and a disc, is exposed to a steam of that temperature, it will be put in a severe heat resisting condition and an expensive material will be required for overcoming the temperature, which results in aggravation of the economical conditions.

However, the intermediate pressure steam coming from the intermediate pressure evaporator 26 is at a temperature of approximately 250° C. If this intermediate pressure steam is mixed into the high pressure exhaust steam of approximately 370° C., then the temperature of this mixed steam lowers to approximately 330° C. and the material of the turbine movable portion such as the moving blade and the disc can be satisfied by a less expensive and easily obtainable material. This results in a favorable turn in the economical conditions.

The intermediate pressure steam supplied from the intermediate pressure evaporator 26 to be mixed into the high pressure exhaust steam is approximately the same in pressure as the high pressure exhaust steam coming out of the high pressure turbine 41. Hence, there occurs no lowering of the entire efficiency due to such mixing and a predetermined temperature lowering can be effected.

The tail tube cooled portion 13a of the combustor 13, being a fixed structural element, is resistible with a less expensive material even to the temperature condition of same 370° C. Hence, the intermediate pressure steam does not need to be mixed into the cooling steam bifurcation passage 15 actively, unless needed specifically.

Also, as a back-up measure for the case where the intermediate pressure steam cannot be obtained as expected, hot water supplied from the intermediate pressure feed water pump 25 via the back-up spray water supply passage 36 is sprayed into the cooling steam supply passage 14 so that the temperature of the cooling steam in the cooling steam supply passage 14 is lowered securely.

The cooling steam which has cooled the high temperature portion 11a of the gas turbine 11 is recovered into the intermediate pressure second reheater 28 via the gas turbine cooling steam recovery passage 37. The cooling steam which has cooled the tail tube cooled portion 13a of the combustor 13 comes to the outlet side of the intermediate pressure second reheater 28 via the tail tube cooling steam recovery passage 38 to join with steam which has been heated through the intermediate pressure second reheater 28 so as to be further supplied to the intermediate pressure turbine 42 for recovery.

According to the present embodiment constructed as mentioned above, the cooling steam for cooling the high temperature portion 11a of the gas turbine 11 is obtained by the high pressure exhaust steam from the high pressure turbine 41 being mixed with the intermediate pressure steam from the intermediate pressure evaporator 26 so as to be lowered in temperature. Thus, the high temperature portion 11a of the gas turbine 11 is less urgently required to be heat resistant and a manufacturing cost of the turbine can be saved.

Figure 8:
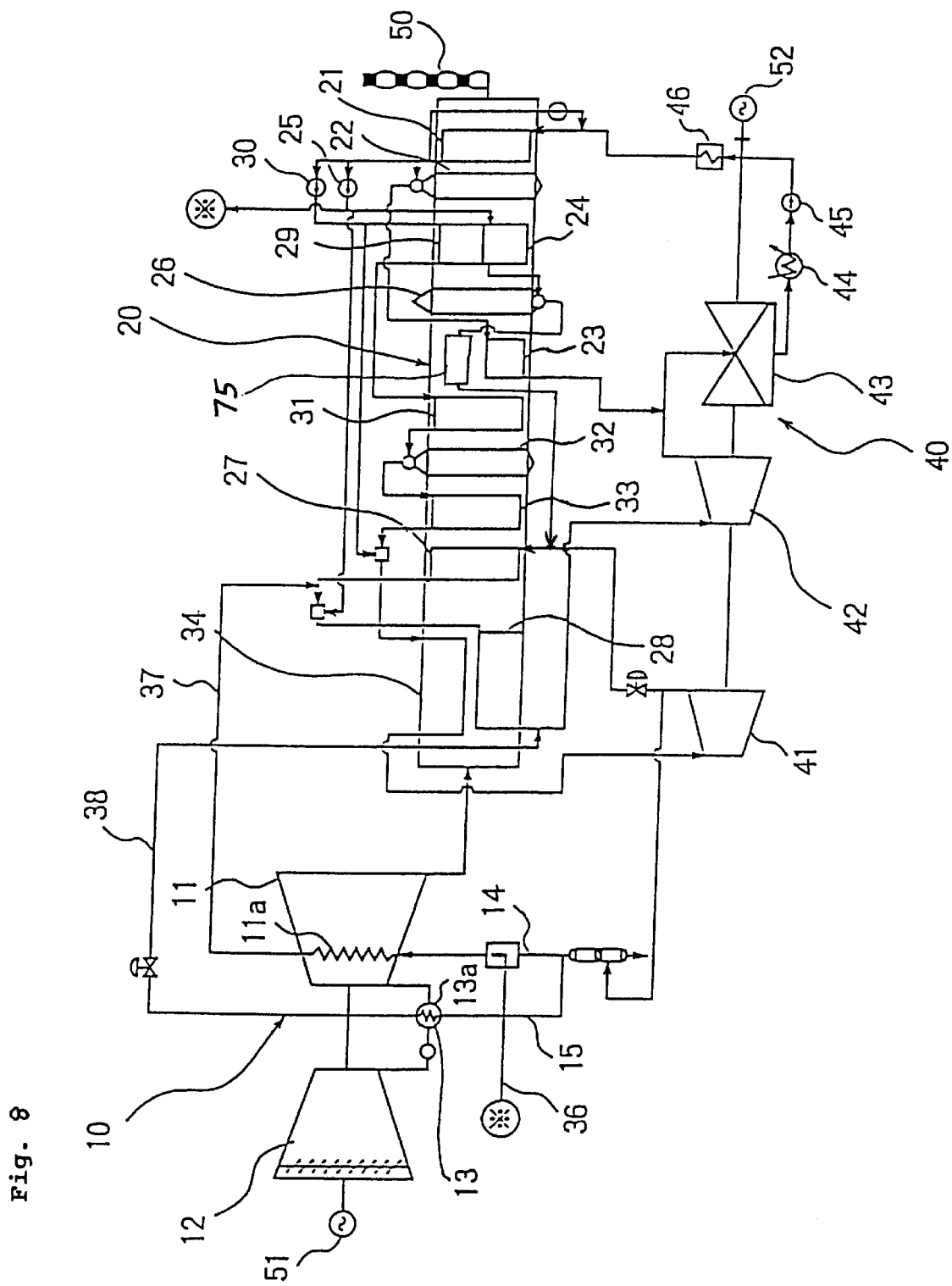
FIG. 8 is a diagrammatic view showing a combined cycle power plant of a ninth embodiment according to the present invention.

An alternative to the first embodiment, specifically, a ninth embodiment of the present invention, is shown in FIG. 8. This embodiment is identical in all respects to the first embodiment shown in FIG. 1, except as noted here. In particular, there is no intermediate pressure steam supply passage 35. Thus, the cooling steam for cooling the high temperature portion 11a of the gas turbine 11 is obtained by mixing the high pressure exhaust steam from the high pressure turbine 41 with only the cooling water spray supplied by the spray water supply passage 36 so as to lower the temperature of the cooling steam.

In this alternative shown in FIG. 8, steam from the intermediate pressure evaporator 26 flows through the intermediate pressure superheater 75, the intermediate pressure first reheater 27, and intermediate pressure second reheater 28 so as to be supplied into the intermediate pressure turbine 42 for work therein. Although not illustrated, the steam from the intermediate pressure evaporator 26 may also flow in another manner. For example, the steam may flow into the tail tube cooled portion 13a of the combustor 13 for cooling thereof. By so using the steam from the intermediate pressure evaporator for specific purposes such as these, the efficiency of the entire combined cycle may be enhanced.

Figure 2:
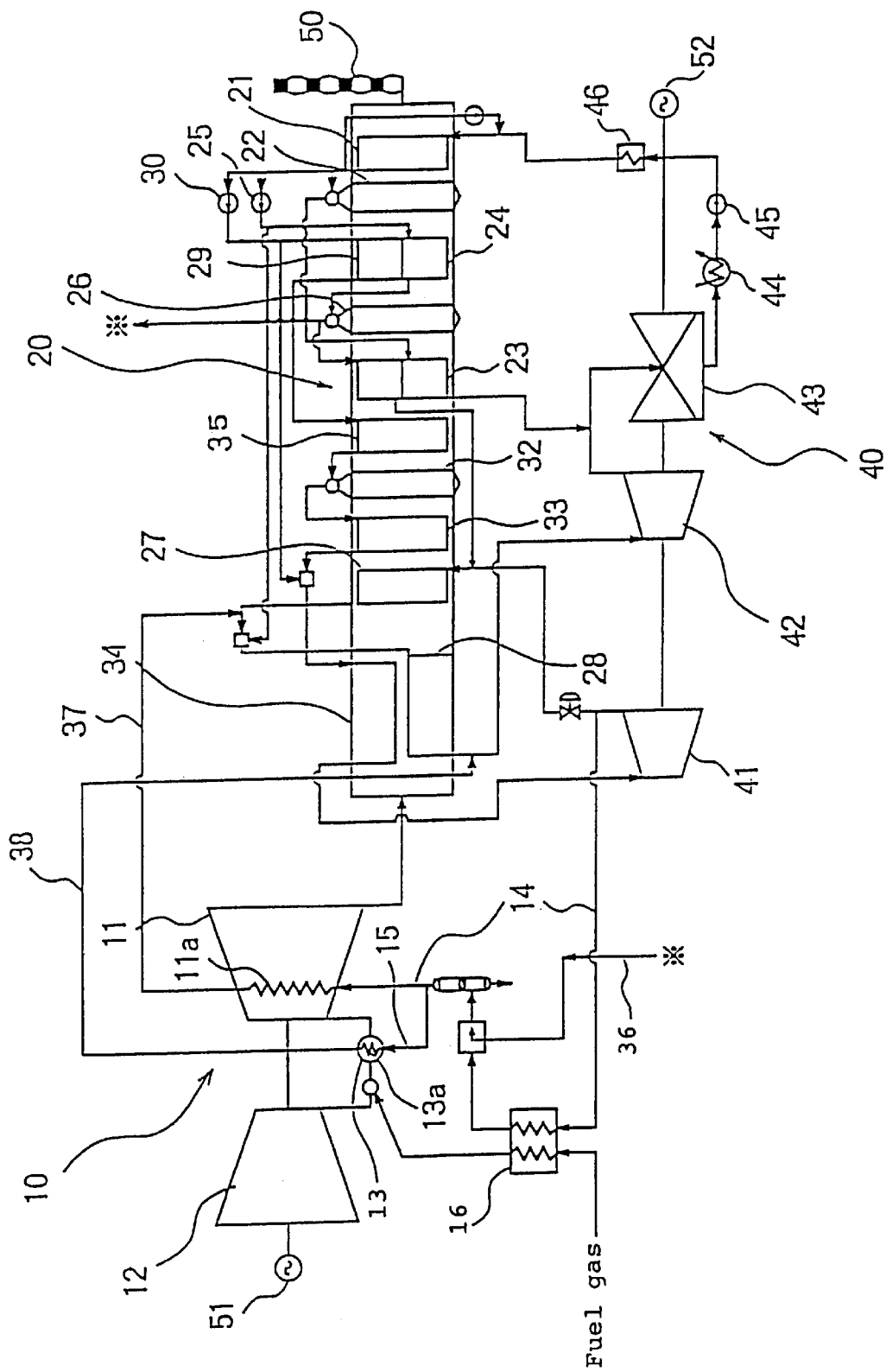
FIG. 2 is a diagrammatic view showing a combined cycle power plant of a second embodiment according to the present invention.

Next, a second embodiment according to the present invention will be described with reference to FIG. 2. It is to be noted that same components or parts as those in the mentioned first embodiment are given the same reference numerals in the figure with repeated description being omitted as much as possible, and a featured construction of the present embodiment will be primarily described.

In the present embodiment, there is provided a fuel heater 16 in the cooling steam supply passage 14 for supplying therethrough the high pressure exhaust steam from the high pressure turbine 41 to the gas turbine 11. The fuel heater 16 is positioned upstream of a bifurcation position of the cooling steam supply passage 14 and the cooling steam bifurcation passage 15 for supplying therethrough the cooling steam to the combustor 13. Therefore, a heat exchange may be done between a fuel to be supplied into the combustor 13 and the high pressure exhaust steam from the high pressure turbine 41.

That is, the high pressure exhaust steam supplied from the high pressure turbine 41 via the cooling steam supply passage 14 is first cooled at the fuel heater 16 by the fuel to be supplied into the combustor 13, and is then bifurcated. One portion thereof flows to the combustor 13 via the cooling steam bifurcation passage 15 for cooling the tail tube cooled portion 13a, and the other portion flows to the gas turbine 11 via the cooling steam supply passage 14 for cooling the high temperature portion 11a thereof.

One example of a temperature lowering of the high pressure exhaust steam cooled at the fuel heater 16 will be shown. If the temperature of the high pressure exhaust steam coming out of the high pressure turbine 41 is approximately 375° C., then a turbine portion, especially a movable portion such as a moving blade and a disc, is exposed to the steam of that temperature so as to be put in a severe heat resisting condition, and an expensive material will be needed for overcoming this condition. This results in aggravation of the economical conditions.

The temperature of the fuel of the gas turbine coming into the fuel heater 16 is as low as 300° C. or less. Therefore, if the high pressure exhaust steam is cooled by that fuel, then the temperature of the high pressure exhaust steam is lowered to approximately 330° C. and the material of the turbine movable portion such as the moving blade and the disc can be satisfied by a less expensive and easily obtainable material. This results in a favorable turn in the economical conditions.

According to the present embodiment constructed as mentioned above, the cooling steam for cooling the high temperature portion 11a of the gas turbine 11 and the tail tube cooled portion 13a of the combustor 13 is obtained by the high pressure exhaust steam from the high pressure turbine 41 being cooled by the gas turbine fuel so as to be lowered in of temperature. Thus, the high temperature portions 11a, 13a are less urgently required to be heat resistant so that employment of an easily obtainable material becomes possible and the manufacturing cost can be saved.

In the present embodiment also, like in the first embodiment, the cooling steam which has cooled the high temperature portion 11a of the gas turbine 11 is recovered into the intermediate pressure second reheater 28 via the gas turbine cooling steam recovery passage 37.

That is, because the cooling steam can be reheated by the intermediate pressure second reheater 28, even if the cooling steam after being used for the cooling of the gas turbine 11 has a temperature which is less than a predetermined level because the high temperature portion 11a of the gas turbine 11 is not of a sufficiently high temperature or that the cooling thereof has not been done sufficiently, that cooling steam can be reheated by the reheater 28. Thus, necessary heat for the downstream steam turbines such as the intermediate pressure turbine can be secured and this results in enhancement of the thermal efficiency.

Next, a third embodiment according to the present invention will be described with reference to FIG. 3. It is to be noted that the same components or parts as those in the mentioned first embodiment are given the same reference numerals in the figure with repeated description being omitted.

Figure 3:
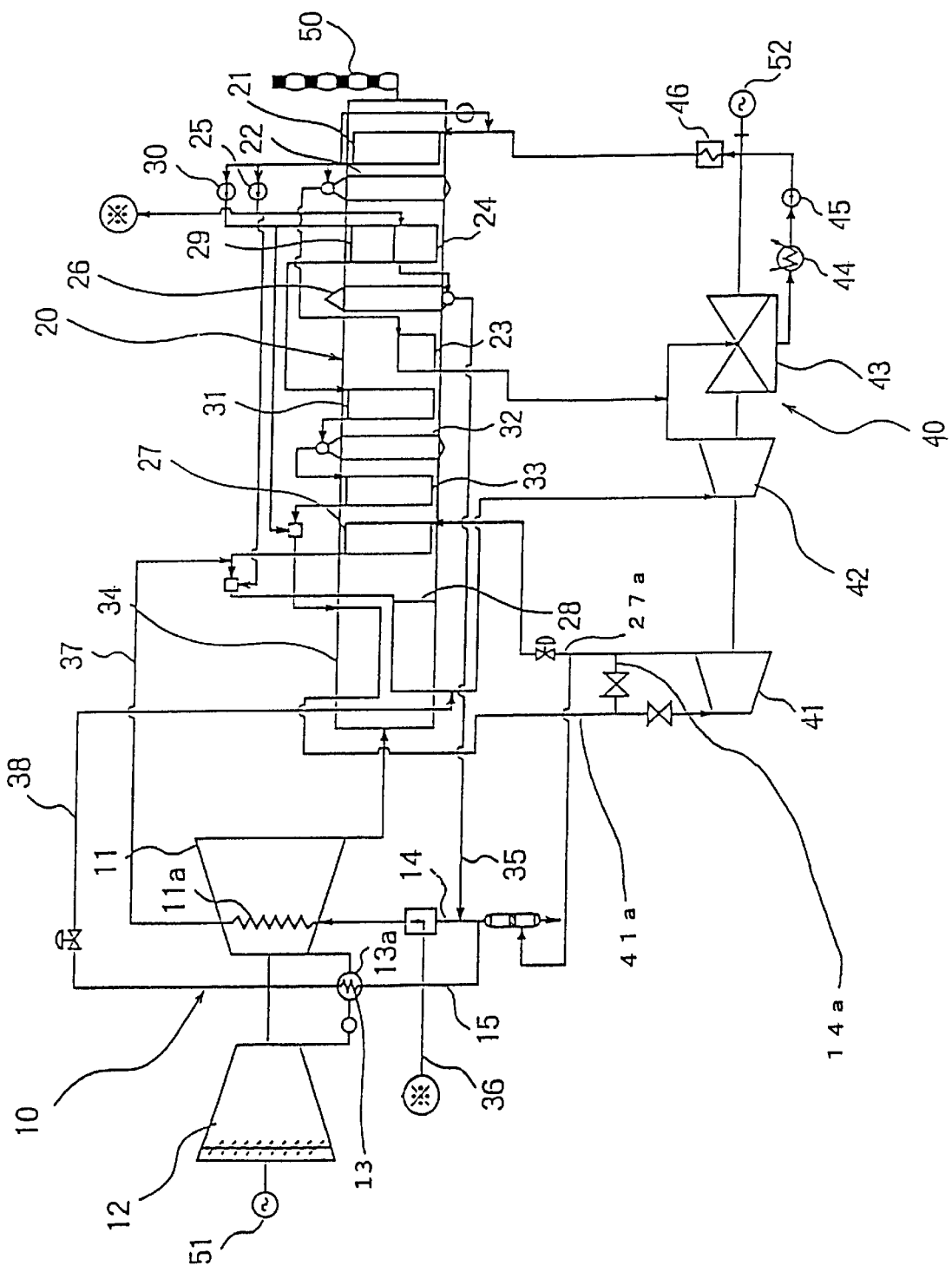
FIG. 3 is a diagrammatic view showing a combined cycle power plant of third and fifth embodiments according to the present invention.

In FIG. 3, numeral 14a designates a-high pressure turbine by-pass passage, which connects at one end to a superheated steam supply passage 41a for supplying therethrough steam from the waste heat recovery boiler 20 to the high pressure turbine 41, and at its other end to a position upstream of a bifurcation position of the cooling steam supply passage 14 for supplying therethrough the high pressure exhaust steam from the high pressure turbine 41 to the high temperature portions of the gas turbine plant to be cooled 10 and also to a high pressure steam exhaust passage 27a for supplying therethrough the high pressure exhaust steam from the high pressure turbine 41 to the intermediate pressure first reheater 27.

That is, in the combined cycle plant, when the plant is to be started in accordance with operation procedures of WSS (weekly start and stop) or DSS (daily start and stop) or the like, the gas turbine is warmed up in advance by a method using an auxiliary boiler or its own compressed air or the like. An initial steam generated at the boiler is supplied into the cooling steam passage of the gas turbine via the high pressure turbine by-pass passage 14a, so that the warming-up is assisted so as to be accelerated.

When the boiler steam starts to be generated stably, the by-pass passage 14a is closed and a high pressure superheated steam is introduced into the high pressure turbine 41. The cooling of the gas turbine is then done by the high pressure exhaust steam from the high pressure turbine 41.

According to the present embodiment constructed as mentioned above, the gas turbine cooling can be done with no thermal shock etc. being caused.

Figure 4:
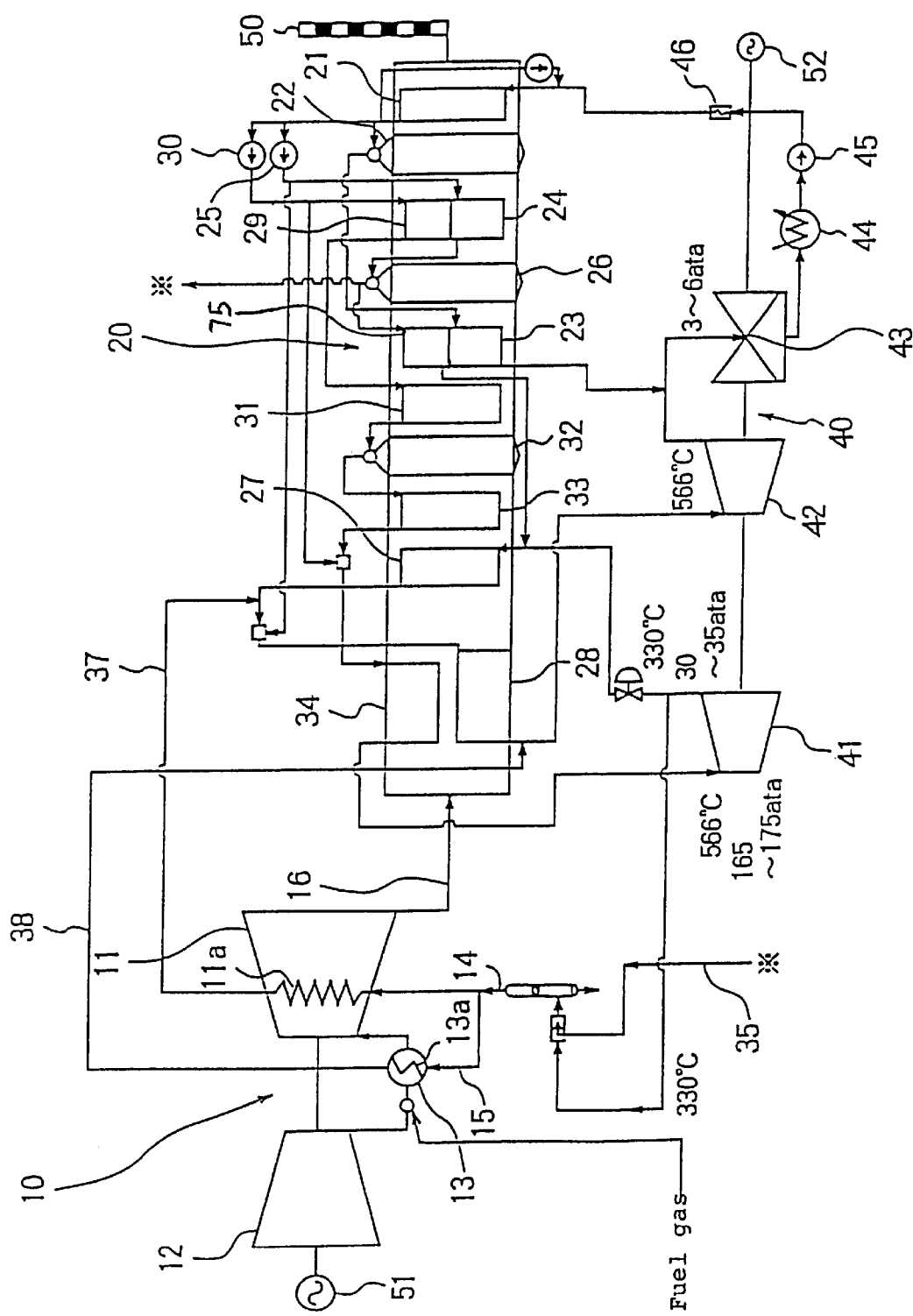
FIG. 4 is a diagrammatic view showing a combined cycle power plant of a fourth embodiment according to the present invention.

Next, a fourth embodiment according to the present invention will be described with reference to FIG. 4. It is to be noted that the same components or parts as those in the mentioned first embodiment are given the same reference numerals in the figure with repeated description being omitted.

In the present embodiment, the high pressure exhaust steam from the high pressure turbine 41 is supplied into the cooling steam supply passage 14 to then be bifurcated. One portion thereof flows to the combustor 13 via the cooling steam bifurcation passage 15 for cooling the tail tube cooled portion 13a, and the other portion flows to the gas turbine 11 via the cooling steam supply passage 14 for cooling the high temperature portion 1a thereof.

The cooling steam is theretofore made up at the high pressure turbine 41 as follows. The high pressure steam supplied into the high pressure turbine 41 is set at a pressure of 165 to 175 ata and a temperature of approximately 566° C. by an appropriate control means (not shown).

Then, the steam supplied into the high pressure turbine 41 at the pressure and temperature changes to a pressure of 30 to 35 ata and a temperature of 330 to 250° C. at an outlet of the high pressure turbine 41. That is, in order to obtain a high pressure steam property of 30 to 35 ata, 330 to 250° C. at the high pressure turbine 41 outlet, taking into account ordinary turbine expansion, the pressure at an inlet of the high pressure turbine 41 is required to be 165 to 175 ata when the inlet temperature is set to approximately 566° C. which is an ordinary value.

The cooling steam coming out of the high pressure turbine 41 is supplied to. the high temperature portion 11a of the gas turbine 11 and the tail tube cooled portion 13a of the combustor 13 via the cooling steam supply passage 14 and the cooling steam bifurcation passage 15, and the temperature of this cooling steam is made up to 330 to 250° C. as mentioned above.

This temperature range is not specifically severe requirement for a heat resistant performance of a material composing the high temperature portion 11a and the tail tube cooled portion 13a. Hence, the material of the turbine movable portion such as the moving blade and the disc can be satisfied by a less expensive and easily obtainable material, which results in a favorable turn in the economical conditions.

It is to be noted that in the present embodiment, the steam property is specified at the high pressure turbine 41 inlet and the cooling steam of a predetermined property is obtained at the high pressure turbine 41 outlet. The heat resisting temperature condition at the high temperature portion 11a and tail tube cooled portion 13a is satisfied without the cooling steam being made up otherwise. However, if there occurs an unexpected variation in the steam making up function before the high pressure turbine 41 or in the operation of the high pressure turbine 41 or the like, an intermediate pressure steam can be supplied into the cooling steam supply passage 14 for back-up via the intermediate pressure steam supply passage 35.

Further, the cooling steam is set at the pressure of 30 to 35 ata at the high pressure turbine 41 outlet. While this pressure range is maintained, there occurs no performance lowering of the downstream intermediate pressure turbine 42, so that there is no fear of efficiency lowering of the entire system.

Also, the steam supplied into the intermediate pressure turbine 42 returns to 566° C. by being heated at the intermediate pressure second reheater 28, recovery heat at the gas turbine plant 10 and the like, and a low pressure steam at an inlet portion of the low pressure turbine is made up to a pressure of 3 to 6 ata.

According to the present embodiment as mentioned above, the cooling steam for cooling the high temperature portion 11a of the gas turbine 11 and the tail tube cooled portion 13a of the combustor 13 has a favorable property at the high pressure turbine 41 outlet. Thus, there occurs no fear of efficiency lowering of the downstream intermediate pressure turbine, and the structural material of the high temperature portion 11a of the gas turbine 11 and the tail tube cooled portion 13a of the combustor 13 only needs a less severe heat resistant ability without any special equipment being otherwise provided and the turbine manufacturing cost can be saved.

Next, a fifth embodiment according to the present invention will be described with reference to FIG. 3. It is to be noted that the same components or parts as those in the mentioned first embodiment are given the same reference numerals in the figure with repeated description being omitted.

In the gas turbine 11, there are provided the combustor 13 for supplying an operating gas to the gas turbine 11 and the air compressor 12 for supply a compressed air to same. Also provided are the high temperature portion 11a of gas turbine 11 having moving blades and stationary blades and the tail tube cooled portion 13a along a wall surface of the combustor 13.

An auxiliary boiler (not shown) is provided outside of the combined cycle system so that steam may be supplied therefrom to the combined cycle system or to other facilities of the power plant in case of necessity.

A steam turbine portion as a bottoming cycle of the combined cycle is constructed of the high pressure turbine 41, the intermediate pressure turbine 42 and the low pressure turbine 43.

Steam from the high pressure second superheater 34 of the waste heat recovery boiler 20 flows, by-passing the high pressure turbine 41, to the high temperature portion 11a of the gas turbine 11 via the high pressure turbine by-pass passage 14a and the cooling steam supply passage 14.

The cooling steam supply passage 14 also forms a passage for supplying therethrough a high pressure exhaust steam from the high pressure turbine 41 as the cooling steam of the high temperature portion 11a of the gas turbine. The gas turbine cooling steam recovery passage 37 forms a passage for recovering therethrough the thermal energy of the cooling steam which has been elevated in temperature at the high temperature portion 11a into the waste heat recovery boiler 20.

Downstream of the high pressure turbine 41 and the subsequent intermediate pressure turbine 42 and low pressure turbine 43, the condenser 44 is provided and a high temperature water condensed there is returned to the waste heat recovery boiler 20 to be evaporated again to repeat the same cycle.

Operational function of the present embodiment formed as mentioned above will be described. That is, in the power plant, plant starts and stops, such as in WSS where the plant starts and stops once a week or in DSS where the plant stops once a day and starts on the next day or after completion of a periodic inspection, often take place.

When the plant is so started, prior to start of the gas turbine 11, auxiliary steam from the auxiliary boiler is supplied into the gas turbine 11 and the combustor 13 so that the high temperature portion 11a of the gas turbine 11 and the tail tube cooled portion 13a along the wall surface of the combustor 13 are warmed up, and is finally recovered into the condenser 44 via a passage which is not shown in the figure.

It is to be noted that the auxiliary steam condition in this case is preferably at a pressure of approximately 20 ata and a temperature of 200 to 300° C. The pressure is higher than that of a combustion gas generated at the starting time of the gas turbine 11 so that equipment may not be damaged by the pressure of the combustion gas generated at the time.

Then, following the warming up, the gas turbine 11 is started so as to be gradually speeded up to reach approximately 20% gas turbine load, and is then held in this state of load for a predetermined time to be maintained until what is called an own boiler steam is generated by the waste heat recovery boiler 20 which uses an exhaust gas from the gas turbine 11 as a heat source.

When the own boiler steam generated by the waste heat recovery boiler 20 comes to a steam condition of approximately 20 ata which corresponds to the pressure of the auxiliary steam, supply of the auxiliary steam is stopped and a steam from the high pressure second superheater 34 is supplied to the gas turbine 11 and the combustor 13 via the superheated steam supply passage 41a, the high pressure turbine by-pass passage 14a and then the cooling steam supply passage 14. The cooling steam which has passed through the high temperature portions 11a, 13a of the gas turbine 11 and the combustor 13 is led into the intermediate pressure second reheater 28 via the gas turbine cooling steam recovery passage 37.

Then, the gas turbine 11 is further speeded up toward the rating. When an outlet pressure of the high pressure second superheater 34 reaches 40 ata, achievement of the rating is confirmed and the high pressure turbine by-pass passage 14a is closed so that the high pressure superheated steam from the high pressure second superheater 34 of the waste heat recovery boiler 20 is supplied into the high pressure turbine 41 via the superheated steam supply passage 41a and the operation is switched to a rated operation.

Thus, later on from this stage, while the high pressure exhaust steam from the high pressure turbine 41 is supplied to the gas turbine cooled portions (i.e., the high temperature portions 11a, 13a of the gas turbine 11 and the combustor 13 for cooling thereof via the cooling steam supply passage 14), the cooling steam is heated through cooling of the cooled portions so as to be given a thermal energy. The cooling steam is then led into the intermediate pressure turbine 42 via the gas turbine cooling steam recovery passage 37 and the intermediate pressure second reheater 28 so that the thermal energy can be recovered.

According to the present embodiment, prior to the start of the gas turbine, the cooled portions are filled with the auxiliary steam. A drain therein is then removed, and the gas turbine cooled portions are warmed by the warm-up operation using the auxiliary steam. Thus, even when the rated operation approaches and the own boiler steam from the high pressure second superheater 34 comes in, there occurs no thermal shock, so that plant having a high reliability and safety can be realized.

Figure 5:
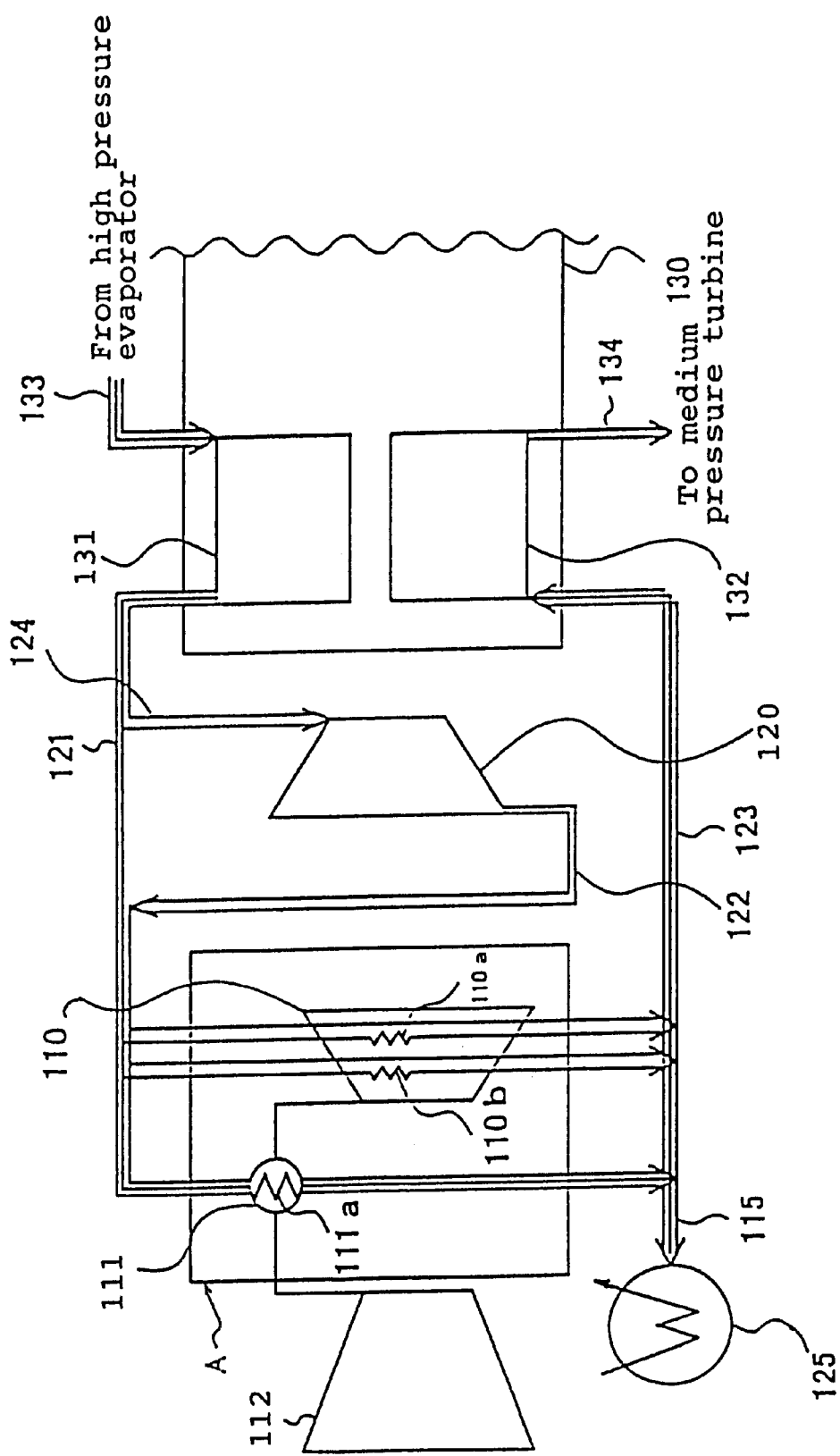
FIG. 5 is a diagrammatic view showing a combined cycle power plant of a sixth embodiment according to the present invention.

Next, a sixth embodiment according to the present invention will be described with reference to FIG. 5. FIG. 5 shows an arrangement relationship among three components of a gas turbine, a steam turbine and a waste heat recovery boiler in a combined cycle power plant.

Numeral 110 designates a gas turbine, which comprises a combustor 111 for supplying an operating gas to the gas turbine 110 and an air compressor 112 for supplying a compressed air to the same. Also provided are a high temperature portion 110a consisting mainly of moving blades and a high temperature portion 110b consisting mainly of stationary blades (both in the gas turbine 110), and a high temperature portion 111a formed along a wall surface of the combustor 111.

Numeral 120 designates a high pressure turbine, which, together with an intermediate pressure turbine and a low pressure turbine (not. shown), forms a steam turbine portion as a bottoming cycle of the combined cycle. In FIG. 5, the high pressure turbine 120 only is shown representatively.

Numeral 121 designates a by-pass passage, which forms a passage for supplying therethrough, by-passing the high pressure turbine 120, steam from a waste heat recovery boiler 130, to be described later, to the high temperature portions 110a, 110b and 111a of the gas turbine 110 and the combustor 111.

Numeral 122 designates a high pressure exhaust steam passage and numeral 123 designates a recovery passage. The high pressure exhaust steam passage 122 forms a passage for supplying therethrough a high pressure exhaust steam from the high pressure turbine 120 to the high temperature portions 110a, 110b and 111a of the gas turbine 110 and the combustor 111. The recovery passage 123 forms a passage for recovering therethrough a thermal energy of the cooling steam, which has been elevated in temperature through cooling of the high temperature portions 110a, 110b and 111a, into the waste heat recovery boiler 130.

The waste heat recovery boiler 130, which is of a three-pressure type of low pressure, intermediate pressure and high pressure generally, is shown here by its high pressure superheater 131 and reheater 131 representatively for easiness of description with other portions thereof being omitted. Numeral 133 designates a high pressure steam passage, which supplies therethrough a high pressure steam from a high pressure evaporator (HPEV) (not shown) to the high pressure superheater 131. Numeral 134 designates a reheated steam passage, which forms a passage for supplying a steam, which has been made up at the reheater 132, to the intermediate pressure turbine (not shown).

It is to be noted that the figure here shows only the basic concept using connecting lines and even in case where same one line is used for showing two or more passages (an exhaust steam passage 115 and the recovery passage 123, for example) there are provided stop valves on the way, where needed. In addition, the respective flow directions therein are suitably regulated to meet predetermined operational directions, for example, the exhaust steam passage 115 is directed to the left in the figure to connect to a condenser 125 and the recovery passage 123 is directed to the right in the figure to connect to the waste heat recovery boiler 130.

Also, in a portion surrounded by A in the figure comprising the gas turbine 110 and the combustor 111, there are provided stop valves upstream and downstream of the high temperature portions 110a, 110b and 111a, respectively, so that the respective passages thereof are openable and closable although not shown in the figure.

Operational function of the present embodiment formed as mentioned above will be described. That is, in the power plant, plant starts and stops such as in WSS where the plant starts and stops once a week, or in DSS where the plant stops once a day and starts on the next day or after completion of a periodic inspection often take place.

When the plant is so started, the upstream and downstream stop valves of the high temperature portions 110a, 110b and 111a of the gas turbine 110 and the combustor 111 in the portion A are closed and the gas turbine 110 is started.

The gas turbine 110 is gradually speeded up in the state to reach a low load of approximately 20% load from no load which needs no cooling of the high temperature portions 110a, 110b and 111a. The gas turbine 110 is then held in this state of load to be maintained until the boiler steam is generated by the waste heat recovery boiler 130.

When the boiler steam of the waste heat recovery boiler 130 comes to a steam condition of approximately 20 ata, the stop valves are opened and a steam from the high pressure superheater 131 is supplied into the high temperature portions 110a, 110b and 111a of the gas turbine 110 and the combustor 111 via the by-pass passage 121 so as to start cooling of the gas turbine 110 and the combustor 111. The cooling steam which has passed through the high temperature portions 110a, 110b and 111a of the gas turbine 110 and the combustor 111 flows to the reheater 132 via the by-pass passage 123.

Then, the gas turbine 110 is further speeded up toward the rating and when an outlet pressure of the high pressure superheater 131 reaches 40 ata, achievement of the rating is confirmed and the by-pass passage 121 is closed so that the high pressure superheated steam from the high pressure superheater 131 of the waste heat recovery boiler 130 is supplied into the high pressure turbine 120 via a superheated steam passage 124, and the operation is switched to a rated operation. Thus, later on from this stage, while the high pressure exhaust steam from the high pressure turbine 120 is supplied to gas turbine cooled portions, that is, the high temperature portions 110a, 110b and 111a of the gas turbine 110 and the combustor 111 for cooling thereof via the high pressure exhaust steam passage 122, the cooling steam is heated through cooling of the cooled portions so as to be given thermal energy. The steam is then led into the intermediate pressure turbine (not shown) via the recovery passage 123, the reheater 132 and the reheated steam passage 134 so that the thermal energy can be recovered.

According to the present embodiment, the gas turbine 110 is started with the cooling steam passages of the high temperature portions 110a, 110b and 111a of the gas turbine 110 and the combustor 111 being closed so that no drain etc. is allowed to come in there, and is warmed up while being held in a low load level which needs no cooling of the gas turbine cooled portions. Then, when the boiler steam generated by the waste heat recovery boiler 130 comes to a predetermined steam condition, cooling of the gas turbine cooled portions is started and the rated operation is effected finally in the rated steam condition. By the operation being done in the procedures, the gas turbine cooled portions are gradually elevated in temperature and then cooled. Hence, even when the rated operation approaches and the boiler steam from the high pressure superheater 131 comes in, there occurs no thermal shock. Thus, a plant having a high reliability and safety can be realized.

Next, a seventh embodiment according to the present invention will be described with reference to FIG. 6. It is to be noted that the same components or parts as those in the mentioned first embodiment are given the same reference numerals in the figure with repeated description being omitted.

Figure 6:
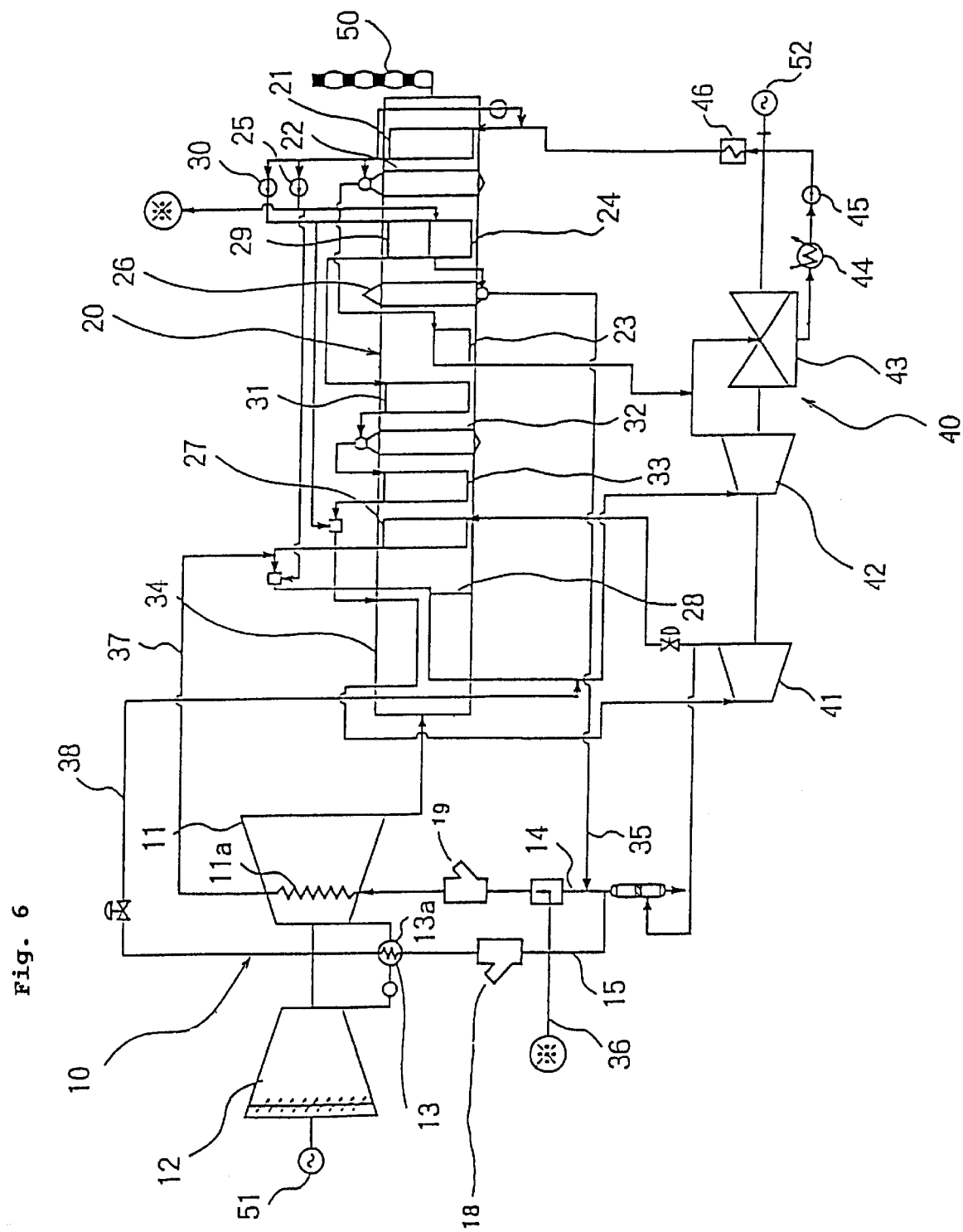
FIG. 6 is a diagrammatic view showing a combined cycle power plant of a seventh embodiment according to the present invention.

In FIG. 6, numeral 18 designates a dust collecting filter, which is positioned in the cooling steam bifurcation passage 15, and specifically, near an inlet of the combustor 13. Numeral 19 also designates a dust collecting filter, which is positioned in the cooling steam supply passage 14 for supplying therethrough the exhaust steam as the cooling steam from the high pressure turbine 41 into the high temperature portion 11a of the gas turbine 11.

These dust collecting filters, although not shown in detail, are constructed with their filter mesh portions being detachable so as to be inserted or drawn out easily. The mesh size is less than 1000 $\mu$m and, specifically, in a range of 100 to 1000 $\mu$m. If the mesh size is smaller than that range, fine particles in the steam stick to the mesh gradually over a long period of use so that frequent exchanges of the mesh becomes necessary. However, because the cooling steam is of a high temperature of 250° C. or more, exchange work of the mesh is difficult.

By selecting the range of the mesh as mentioned above, fine particles in the steam pass through the mesh to enter the high temperature portion 11a of the gas turbine 11 and the tail tube cooled portion 13a of the combustor 13. Nevertheless, because the steam flows there at a high velocity, there is little possibility of accumulation of the fine particles in the passages. Further, solid particles of impurities of dropped scales etc. in the respective steam passages, being larger than the mesh size usually, are removed by the mesh before they enter the high temperature portion 11a and the tail tube cooled portion 13a. Therefore, blockage of the passages due to these dropped solid particles can be prevented.

Also, because the mesh size is in the range of 100 to 1000 μm, dropped solid particles from main steam piping only are removed by the mesh and fine particles pass therethrough, a long period of use becomes possible and frequency of exchanging the mesh due to clogging thereof is reduced remarkably.

An eighth embodiment according to the present invention will be described with reference to FIG. 7. It is to be noted that the same components or parts as those in the mentioned first embodiment are given the same reference numerals in the figure with repeated description being omitted.

Figure 7:
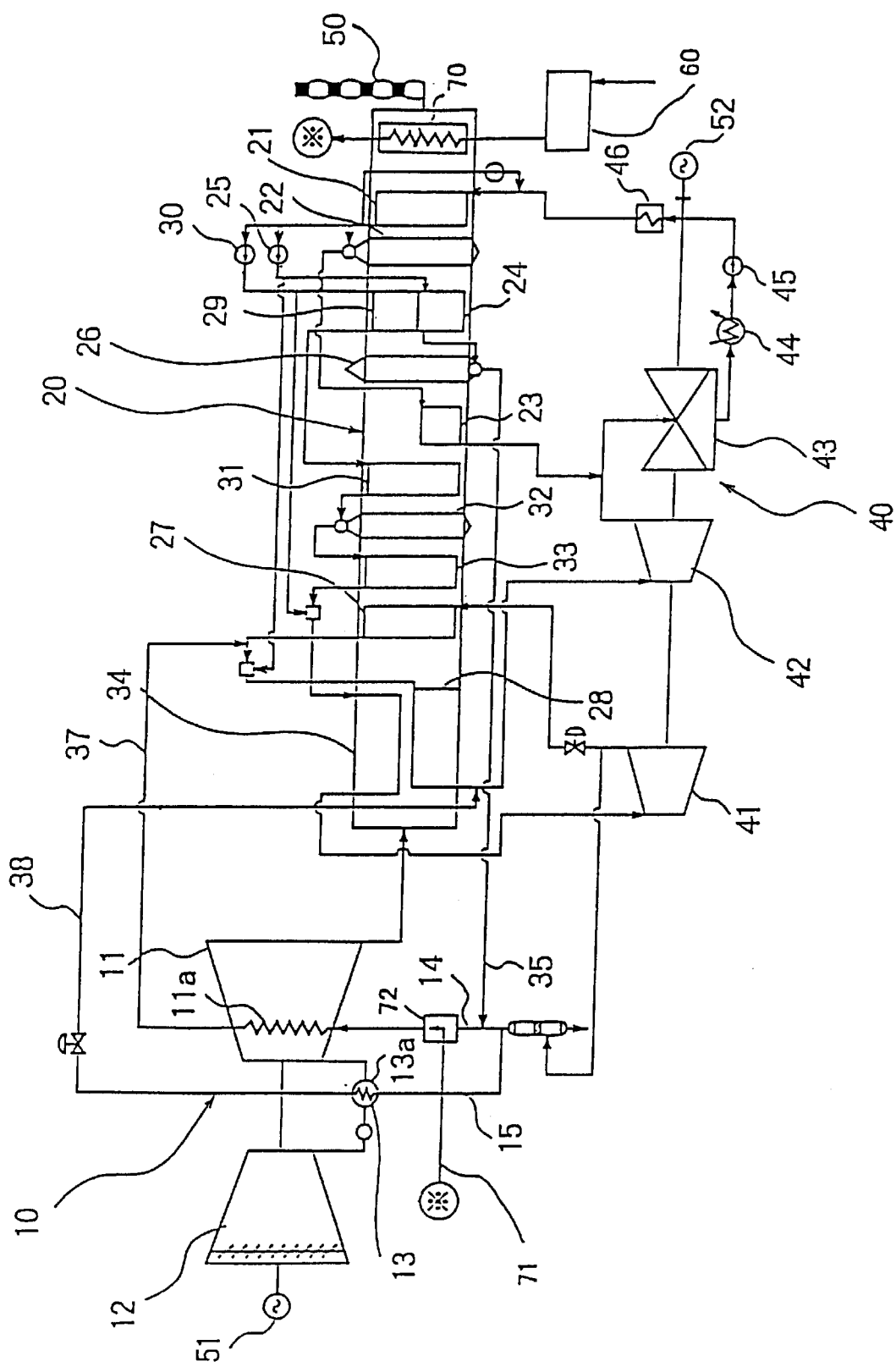
FIG. 7 is a diagrammatic view showing a combined cycle power plant of an eighth embodiment according to the present invention.

In FIG. 7, numeral 60 designates an impurity removing device, which is exclusive for removing fine particles of solid and the like in feed water and is of a capacity corresponding to a feed water spray amount. Numeral 70 designates an economizer, which is exclusive for heating water for feed water spraying only and is of a capacity corresponding to an amount of the feed water. Numeral 71 designates a feed water piping and numeral 72 designates a feed water spray nozzle.

The cooling steam led into the stationary blades of the high temperature portion 11a of the gas turbine 11, being usually of nearly the same temperature as that appropriate for cooling of the stationary blades, can be led into the high temperature portion as it is for cooling of the stationary blades. On the other hand, an appropriate temperature for cooling of the moving blades of the high temperature portion 11a being lower than that for cooling of the stationary blades, the cooling steam led into the high temperature portion 11a for cooling of the moving blades must be adjusted in temperature. For this purpose, the temperature adjustment is done such that feed water from the feed water spray nozzle 72 is heated at the economizer 70 so as to approach as near as possible the steam temperature appropriate for cooling of the moving blades, 318° C. for example, and is then sprayed as a high temperature water.

The feed water is first passed through the exclusive impurity removing device 60 which has a capacity to treat water in the amount corresponding to that of the feed water and is then led into the waste heat recovery boiler 20 to be heated to become the high temperature water by the exclusive economizer 70 for heating the feed water. The feed water is then led into the feed water piping 71. The high temperature water from the feed water piping 71 is sprayed into cooling steam pipings of the moving blades by the feed water spray nozzle 72 so that the steam flowing through the high temperature portion 11a of the gas turbine 11 is adjusted in temperature appropriately for cooling of the moving blades.

The exclusive economizer 70 is made such that an existing economizer in the prior art is separated into a device for heating only the feed water for cooling of the moving blades. Also, the impurity removing device 60 is made exclusively for the feed water sprayed into the steam for cooling of the moving blades so as to be compact-sized. Therefore, there is no needed large device for removing impurities from an entire water returning to the waste heat recovery boiler 20 so that a cost reduction can be realized.

In the above, the invention has been described on the embodiments illustrated in the figures but the invention is not limited thereto. Needless to mention, various modifications in the concrete structures may be added within the scope of the invention as claimed herebelow.

Industrial Applicability

According to the first invention hereof, a combined cycle power plant is constructed of a combination of a gas turbine plant and a steam turbine plant, and comprises a waste heat recovery boiler for generating a steam turbine driving steam by use of gas turbine exhaust heat. Steam supplied from an intermediate pressure evaporator is mixed into a cooling steam supply passage for supplying therethrough exhaust steam from a high pressure steam turbine as cooling steam into a high temperature portion of the gas turbine. As a result, cooling steam temperature is lowered with the entire efficiency being by no means lowered. The gas turbine high temperature portion which is a portion to be cooled can be satisfied by a less heat resistant ability so as to be designed and made of a less expensive and easily obtainable material, and yet a sufficient amount of the cooling steam is secured so as to ensure a stable cooling. Thus, a combined cycle power plant which is remarkably excellent in the cost saving aspect and the cooling performance aspect can be obtained.

According to the second invention hereof, a combined cycle power plant is constructed of combination of a gas turbine plant and a steam turbine plant and comprises a waste heat recovery boiler for generating a steam turbine driving steam by use of gas turbine exhaust heat. Exhaust steam supplied from a high pressure steam turbine and cooled by gas turbine fuel is supplied into a high temperature portion of the gas turbine as cooling steam. Thus, the gas turbine high temperature portion which is a portion to be cooled can be satisfied by a less heat resistant ability so as to be designed and made of a less expensive and easily obtainable material and yet a sufficient amount of the cooling steam is. secured so as to ensure a stable cooling. Thus, a combined cycle power plant which is remarkably excellent in the cost saving aspect and the cooling performance aspect can be obtained.

According to the third invention hereof, a combined cycle power plant is constructed of combination of a gas turbine plant and a steam turbine plant and comprises a waste heat recovery boiler for generating a steam turbine driving steam by use of gas turbine exhaust heat. Steam which has cooled a gas turbine high temperature portion is led into a reheater for reheating thereof, thereby even if the cooling steam which has cooled the gas turbine high temperature portion is not given a sufficient heat, the cooling steam is reheated at the reheater to be given a sufficient heat securely. This heat so made up by the reheater is recovered at a downstream intermediate pressure turbine etc., and enhancement of the entire efficiency can be attained.

According to the fourth invention hereof, a combined cycle power plant is constructed of a combination of a gas turbine plant and a steam turbine plant and comprises a waste heat recovery boiler for generating a steam turbine driving steam by use of gas turbine exhaust heat. A high pressure turbine by-pass passage is provided for connecting a superheated steam supply passage for supplying therethrough superheated steam from a high pressure superheater into a high pressure turbine and a cooling steam supply passage for supplying therethrough exhaust steam from the high pressure turbine as cooling steam into a gas turbine high temperature portion. When the plant is to be started, the gas turbine is warmed up in advance by use of an auxiliary boiler or its own compressed air or the like, and an initial steam generated at the boiler is supplied into a cooling steam passage of the gas turbine via the high pressure turbine by-pass passage so that the warming-up is assisted and accelerated. Further, when the own boiler steam starts to be generated stably, the high pressure turbine by-pass passage is closed and a high pressure superheated steam is introduced into the high pressure turbine and cooling of the gas turbine is done by a high pressure exhaust steam from the high pressure turbine. Thus, the gas turbine cooling can be done stably with no thermal shock etc. being caused, stability of operation is enhanced and a highly reliable plant can be obtained.

According to the fifth invention hereof, as a gas turbine cooling method in the combined cycle power plant of the first invention, the gas turbine is supplied with the cooling steam while the plant is operated such that when the inlet temperature of the high pressure turbine is set to approximately 566° C., the inlet pressure of the high pressure turbine is adjusted to 165 to 175 ata and exhaust steam of the high pressure turbine is maintained at a temperature of 330 to 250° C. and a pressure of 35 to 30 ata. Thus, the cooling steam of approximately 566° C. at the high pressure turbine inlet is adjusted to a pressure of 165 to 175 ata. As a result, the property of the high pressure exhaust steam at the high pressure turbine outlet is lowered to 330 to 250° C. and 35 to 30 ata and the cooling steam temperature also can be lowered without lowering of the efficiency of the downstream equipments, the intermediate pressure turbine for example. Hence, the downstream gas turbine high temperature portion which is a portion to be cooled can be satisfied by a less heat resistant ability so as to be made of a less expensive.and easily obtainable material and yet a stable cooling can be done without lowering of the entire efficiency. Thus, a combined cycle power plant which is remarkably excellent in the cost saving aspect and the cooling performance aspect can be obtained.

According to the sixth invention hereof, as a gas turbine cooling method in the combined cycle power plant mentioned in any one of the first to fourth inventions, the gas turbine high temperature portion is supplied with auxiliary steam prior to starting the gas turbine so that the gas turbine is warmed up, and the auxiliary steam is at a combustion gas pressure or more at the starting time of the gas turbine. The gas turbine is then started in that state to do a holding operation for a predetermined time at a predetermined load. When steam from the waste heat recovery boiler comes to a condition of the auxiliary steam, supply of the auxiliary steam is stopped and steam is supplied, by-passing the high,pressure turbine, from the high pressure superheater of the waste heat recovery boiler into the gas turbine high temperature portion. When output of the waste heat recovery boiler comes to a rating thereof, the by-passing is closed and exhaust steam from the high pressure turbine is supplied into the gas turbine high temperature portion so as to switch to a rated operation. The cooling steam is so supplied with the procedures being taken, so that a safe and stable starting of the plant takes place without occurrence of thermal shock which is unfavorable to the cooled portion to be then switched to a stable rated operation. Thus, reliability of this kind of the combined cycle power plant can be further enhanced.

According to the seventh invention hereof, as a gas turbine cooling method in the combined cycle power plant mentioned in any one of the first to fourth inventions, while the gas turbine high temperature portion is closed upstream and downstream thereof, the gas turbine is started to do a holding operation for a predetermined time at a low load of level which requires no cooling of the gas turbine high temperature portion. When the waste heat recovery boiler comes to a level to generate a predetermined own boiler steam, the closing is opened and steam is supplied, by-passing the high pressure turbine, from the high pressure superheater of the waste heat recovery boiler into the gas turbine high temperature portion. When output of the waste heat recovery boiler comes to a rating thereof, the by-passing is closed and exhaust steam from the high pressure turbine is supplied into the gas turbine high temperature portion so as to switch to a rated operation. The cooling steam is so supplied with the procedures being taken so that the gas turbine high temperature portion is heated and cooled gradually in a good balance between the temperature elevation and the cooling, and a safe and stable starting of the plant takes place without occurrence of thermal shock which is unfavorable to the cooled portion to be then switched to a stable rated operation. Thus, reliability of this kind of the combined cycle power plant can be further enhanced.

According to the eighth invention hereof, in the combined cycle power plant mentioned in any one of the first to fourth inventions, a dust collecting filter is provided at a cooling steam inlet portion of the gas turbine high temperature portion, and a mesh of the dust collecting filter is in a range of 100 to 1000 $\mu$m. Therefore, dropped solids such as scales etc. in the main steam system are prevented from coming into the cooling steam passage, the frequency of clogging of the dust collecting filter due to fine particles is lessened so that prolonged use thereof becomes possible, and frequent exchange work of same is reduced. Also, no large facilities are needed for dust collection of the steam flowing into the gas turbine cooling steam passage, and a simple structure of the dust collecting filter is realized by use of a detachable mesh portion.

Finally, according to the ninth invention, in the combined cycle power plant mentioned in any one of the first to fourth inventions, there are provided an impurity removing device which is exclusive for treating water for temperature adjustment, an economizer which is exclusive for heating the water from the impurity removing device, and a spray nozzle for spraying the water heated at the economizer into cooling steam which flows into the gas turbine high temperature portion so that the cooling steam temperature is adjusted. Thus, only by providing the exclusive impurity removing device of the capacity only to treat the water of the amount necessary for adjusting the cooling steam temperature and the exclusive economizer for heating only the water so treated at the impurity removing device, there are needed no large facilities such as an impurity removing device for treating entire amount of the water condensed, etc. and cost reduction of the facilities can be achieved. Moreover, the water to be sprayed is heated to become a high temperature water of a temperature near the cooling steam temperature. Hence, the adjustment of the cooling steam temperature becomes facilitated and can be done efficiently.

We claim:

1. A combined cycle power plant comprising:
   a gas turbine plant having a high temperature portion, said gas turbine plant including a gas turbine, an air compressor driven by said gas turbine, and a combustor for burning fuel and compressed air from said air compressor;
   a waste heat recovery boiler for generating steam by using exhaust heat from said gas turbine plant as a heat source, said waste heat recovery boiler including a high pressure steam generating portion;
   a steam turbine plant including a high pressure turbine communicating with said high pressure steam generating portion of said waste heat recovery boiler so as to receive high pressure steam from said high pressure steam generating portion; and a cooling steam supply passage communicating with said gas turbine plant and with said steam turbine plant so as to supply cooling steam into said high temperature portion of said gas turbine plant, wherein said cooling steam supply passage is adapted to receive and mix only an exhaust steam from said high pressure turbine and a cooling water spray such that a temperature of the cooling steam is adjusted to a temperature appropriate for cooling said high temperature portion of said gas turbine plant.

2. A cooling steam supply method using the combined cycle power plant of claim 1, comprising:

operating the combined cycle power plant under operating conditions such that an inlet steam temperature to said high pressure turbine is set at approximately 566° C., an inlet steam pressure to said high pressure turbine is between 165 ata and 175 ata, an outlet exhaust steam temperature from said high pressure turbine is between 250° C. and 330° C., and an outlet exhaust steam pressure from said high pressure turbine is between 30 ata and 35 ata; and supplying cooling steam to said gas turbine plant as said combined cycle power plant operates under said operating conditions.

3. The combined cycle power plant of claim 1, further comprising a dust collecting filter at a cooling steam inlet of said high temperature portion of said gas turbine plant, said dust collecting filter having a mesh of 1000 $\mu$m or less.

4. The combined cycle power plant of claim 3, wherein said mesh of said dust collecting filter is in a range of 100 $\mu$m to 1000 $\mu$m.

5. The combined cycle power plant of claim 1, further comprising:

a temperature adjustment water supply passage communicating with said cooling steam supply passage for supplying cooling water to said cooling steam supply passage;

an impurity removing device arranged in said temperature adjustment water supply passage for treating the cooling water;

an economizer arranged in said temperature adjustment water supply passage downstream of said impurity removing device for heating the cooling water from said impurity removing device; and a spray nozzle arranged in said temperature adjustment water supply passage at said cooling steam supply passage for spraying the cooling water heated by said economizer into said cooling steam supply passage so as to adjust the temperature of the cooling steam.

6. The combined cycle power plant of claim 1, wherein said high temperature portion of said gas turbine plant comprises a high temperature portion of said gas turbine.

7. The combined cycle power plant of claim 1, wherein said high temperature portion of said gas turbine plant comprises a high temperature portion of said combustor.

8. The combined cycle power plant of claim 1, wherein said waste heat recovery boiler further includes an intermediate pressure steam generating portion, and a low pressure steam generating portion; and wherein said steam turbine plant further includes an intermediate pressure turbine communicating with said intermediate pressure steam generating portion of said waste heat recovery boiler so as to receive intermediate pressure steam from said intermediate pressure steam generating portion, and a low pressure turbine communicating with said low pressure steam generating portion of said waste heat recovery boiler so as to receive low pressure steam from said low pressure steam generating portion.

* * * * *